United States Patent
Rogers, Jr. et al.

(10) Patent No.: US 6,217,097 B1
(45) Date of Patent: Apr. 17, 2001

(54) POWER OPERATED TAILGATE

(75) Inventors: Lloyd Walker Rogers, Jr., Shelby Township, Macomb County; Ronald James Wilde, St. Clair Shores, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/358,628

(22) Filed: Jul. 21, 1999

(51) Int. Cl.[7] .................................................. B62D 25/00
(52) U.S. Cl. ..................... 296/57.1; 296/106; 296/146.4; 49/342; 49/343
(58) Field of Search ................................. 296/57.1, 106, 296/146.4; 49/342, 343

(56) References Cited

U.S. PATENT DOCUMENTS

| | | | | |
|---|---|---|---|---|
| 2,059,737 | * | 11/1936 | Mather ................................. | 296/57.1 |
| 2,119,911 | * | 6/1938 | Fox-Williams ......................... | 49/342 |
| 3,004,757 | * | 10/1961 | Lohr ..................................... | 296/57.1 |
| 3,145,988 | * | 8/1964 | Colauth et al. ....................... | 296/57.1 |
| 3,715,931 | * | 2/1973 | Littmann ............................... | 49/342 |
| 4,076,310 | * | 2/1978 | Schwalm .............................. | 296/57.1 |
| 4,702,511 | * | 10/1987 | Olins ..................................... | 296/57.1 |
| 5,234,249 | * | 8/1993 | Dorrell .................................. | 296/57.1 |
| 5,449,212 | * | 9/1995 | Seifert .................................. | 296/57.1 |
| 5,518,287 | * | 5/1996 | Totani .................................. | 296/57.1 |
| 5,765,308 | * | 6/1998 | Anderson et al. ..................... | 49/342 |
| 5,802,913 | * | 9/1998 | Winner ................................. | 49/342 |
| 6,068,321 | * | 5/2000 | Ooms ................................... | 296/57.1 |

\* cited by examiner

*Primary Examiner*—Joseph D. Pape
*Assistant Examiner*—Kiran B. Patel
(74) *Attorney, Agent, or Firm*—Patrick M. Griffin

(57) ABSTRACT

A power-operated tailgate has a bottom end that is pivotally attached to a vehicle by a hinge so that the tailgate pivots about a hinge axis between a raised position and a lowered position. A rotor is mounted on the vehicle for rotation about a rotor axis between a first position and a second position. A link is pivotally attached to the rotor and to the tailgate so that the tailgate is raised and lowered when the rotor is rotated back and forth between the first and second positions by a motor. The link cooperates with an over center stop on the vehicle when the tailgate is in the raised position and with a second stop on the vehicle when the tailgate is in the lowered position.

12 Claims, 3 Drawing Sheets

POWER OPERATED TAILGATE

TECHNICAL FIELD

This invention relates to vehicles that have a tailgate hinged at the bottom to the aft end of a vehicle.

BACKGROUND OF THE INVENTION

Sport utility vehicles have tailgates hinged at the bottom to the aft end of a vehicle. These tailgates are lowered manually to provide access to the cargo area. After the cargo is loaded, the tailgate is raised manually. The tailgate is latched in the raised position by fork-bolt type latches on each side of the tail gate that engage cooperative striker pins fastened to the vehicle pillars on either side of the tailgate opening. The tailgate, which is relatively heavy, must be unlatched and lowered manually which is a two-hand operation for most people. Cargo, such as groceries, small packages, plants, suit cases and garment bags, is often hand carried to the cargo area of the vehicle for loading making it at least inconvenient and sometimes very difficult to lower the tailgate manually. Once the cargo is loaded, the tailgate must be raised and slammed shut in order for the fork bolts to latch onto the striker pins securely. This manual closing operation is also inconvenient and sometimes difficult even when two hands are free.

Tailgate latches nearly always include a lock mechanism that must be unlocked before the tailgate can be unlatched and lowered. The lock mechanism increases the inconvenience and difficulty in operating the tailgate manually, particularly in the manual opening operation.

Pick-up trucks customarily have a cargo box that is equipped with a tailgate that is hinged at the aft end of the cargo box to provide access to the cargo box. These tailgates are also raised and lowered manually. However, tail gates for pick-up trucks may have clasps at each upper corner of the tailgate that are manually engaged to hold the tailgate in the raised position instead of fork bolt latches and striker pins. Either way, truck tailgates have more or less the same operational inconvenience and difficulty as tailgates on sport utility vehicles.

SUMMARY OF THE INVENTION

The invention provides a power operated tailgate for a vehicle that includes a compact, rugged and simple mechanism for raising the lowering the tailgate that is preferably driven by a reversible electric motor. The mechanism preferably includes an over center stop to secure the tailgate in the raised position without need for latches or locks.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENT

Figure 1:
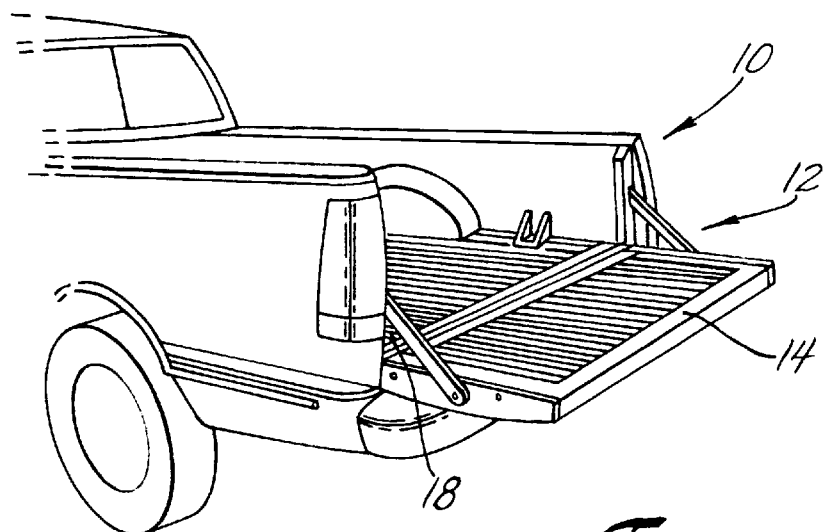
FIG. 1 is a fragmentary perspective view of a vehicle equipped with a power tailgate of the invention showing the tailgate in the lowered position.

Referring now to the drawing, a pick-up truck 10 is equipped with a power operated tailgate of the invention indicated generally at 12. The power operated tailgate 12 comprises a tailgate 14 having a bottom end 16 that is hinged to the aft end of the truck bed 18 so that tailgate 14 pivots about a horizontal hinge axis 20 between a raised position shown in FIGS. 1 and 3 and a lowered position shown in FIGS. 2 and 4. The mechanism for raising and lowering tailgate 14 is inside the hollow sidewall of the truck bed 18. The inner panel of the sidewall is broken away to illustrate the mechanism in FIGS. 2, 3 and 4.

The mechanism comprises a rotor 22 that is mounted to the outer panel of the side wall of the truck bed 18 by a bracket 24 for rotation about a rotor axis 25 that is preferably substantially parallel to hinge axis 20. Rotor 22 comprises a concentric sector gear 26 and a sector arm 28 that rotates in unison with the sector gear 26. Sector arm 28 may be made as a separate piece and attached to sector gear 26 as shown in the drawing or sector arm 28 may be made as an integral part of sector gear 26. In either event, a support link 30 is pivotally attached to the projecting end of sector arm 28. Support link 30 extends through slots 32 and 33 in the hollow truck pillar 34 at the aft end of truck bed 18. The opposite protruding end of support link 30 is pivotally attached to the side of tailgate 14 at a location spaced from hinge axis 20.

The mechanism for raising and lowering tailgate 14 includes a motor, preferably a reversible electric motor 36 that is controlled by a suitable motor control, for example, limit switches 38 and 40, a raise/lower switch 42 and an on/off control switch 43 that are part of a motor control circuit 44. Motor controls for reversible electric motors are well known in the art and consequently, switches 38, 40, 42 and 43 and motor control circuit 44 are merely illustrated schematically as one possible example of several suitable motor controls and not shown in detail. Suffice it to state that motor 36 drives sector gear 26 via a gear set 37 clockwise from a first (tailgate raised or closed) position shown in FIGS. 1 and 3 to a second (tailgate lowered or open) position shown in FIGS. 2 and 4 where arm 28 engages limit switch 38 to deenergize motor 36 and reset motor 36 for reverse rotation and drive upon subsequent energization. When later energized, motor 36 then drives sector gear 26 counterclockwise from the lowered position shown in FIGS. 2 and 4 back to the raised position shown in FIGS. 1 and 3 where arm 28 engages limit switch 40 so that motor 36 is stopped and reset for forward drive in the clockwise direction upon the next energization.

Figure 2:
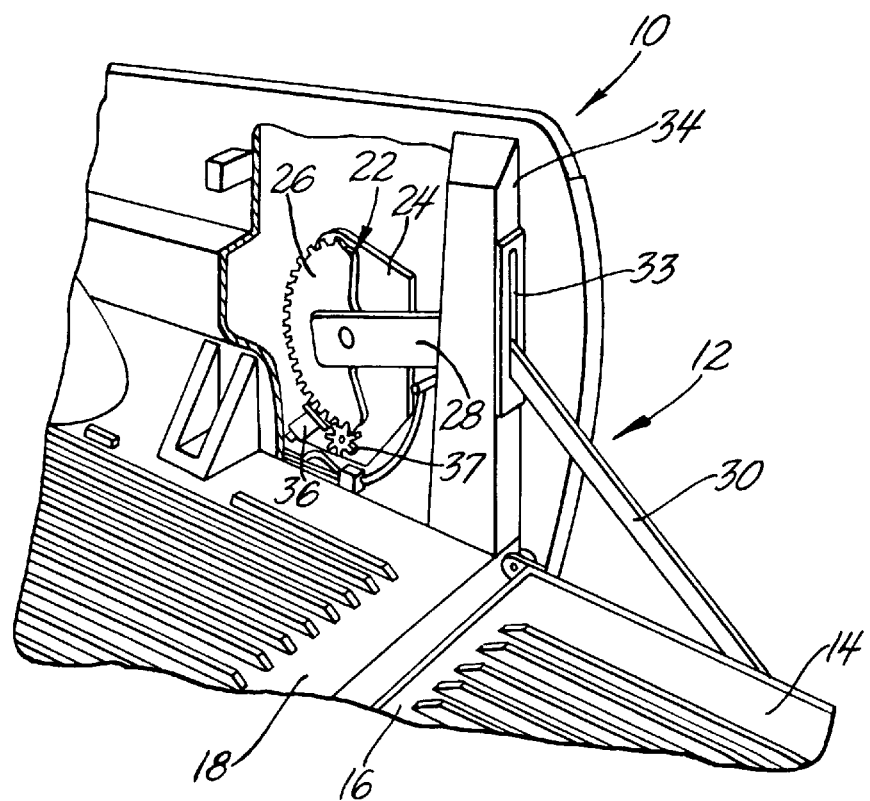
FIG. 2 is an enlarged fragmentary perspective view of the vehicle of FIG. 1 showing the tailgate in the lowered position.
Figure 3:
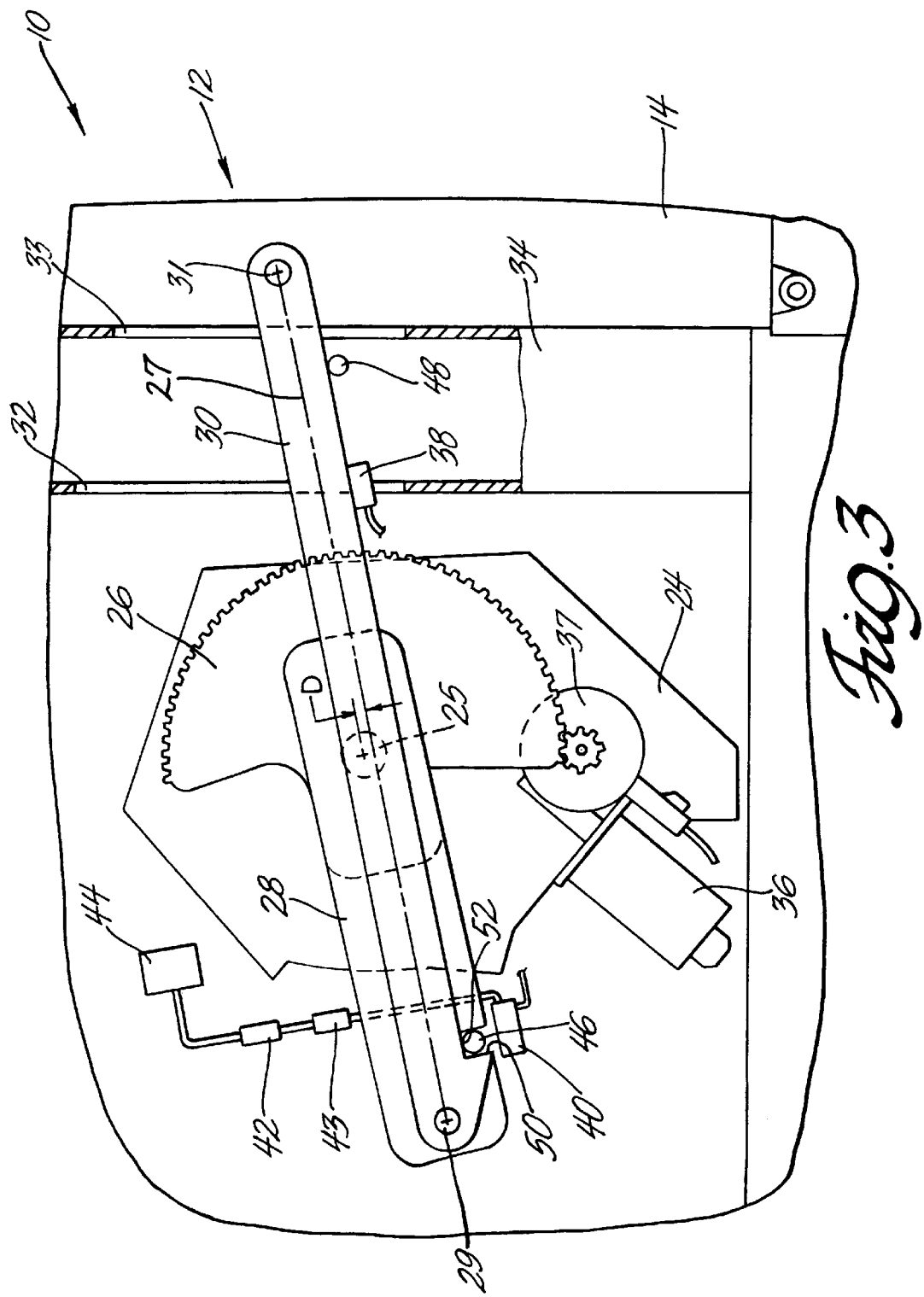
FIG. 3 is a side view of the vehicle and power tailgate of FIG. 1 showing the parts when the tailgate is raised.
Figure 4:
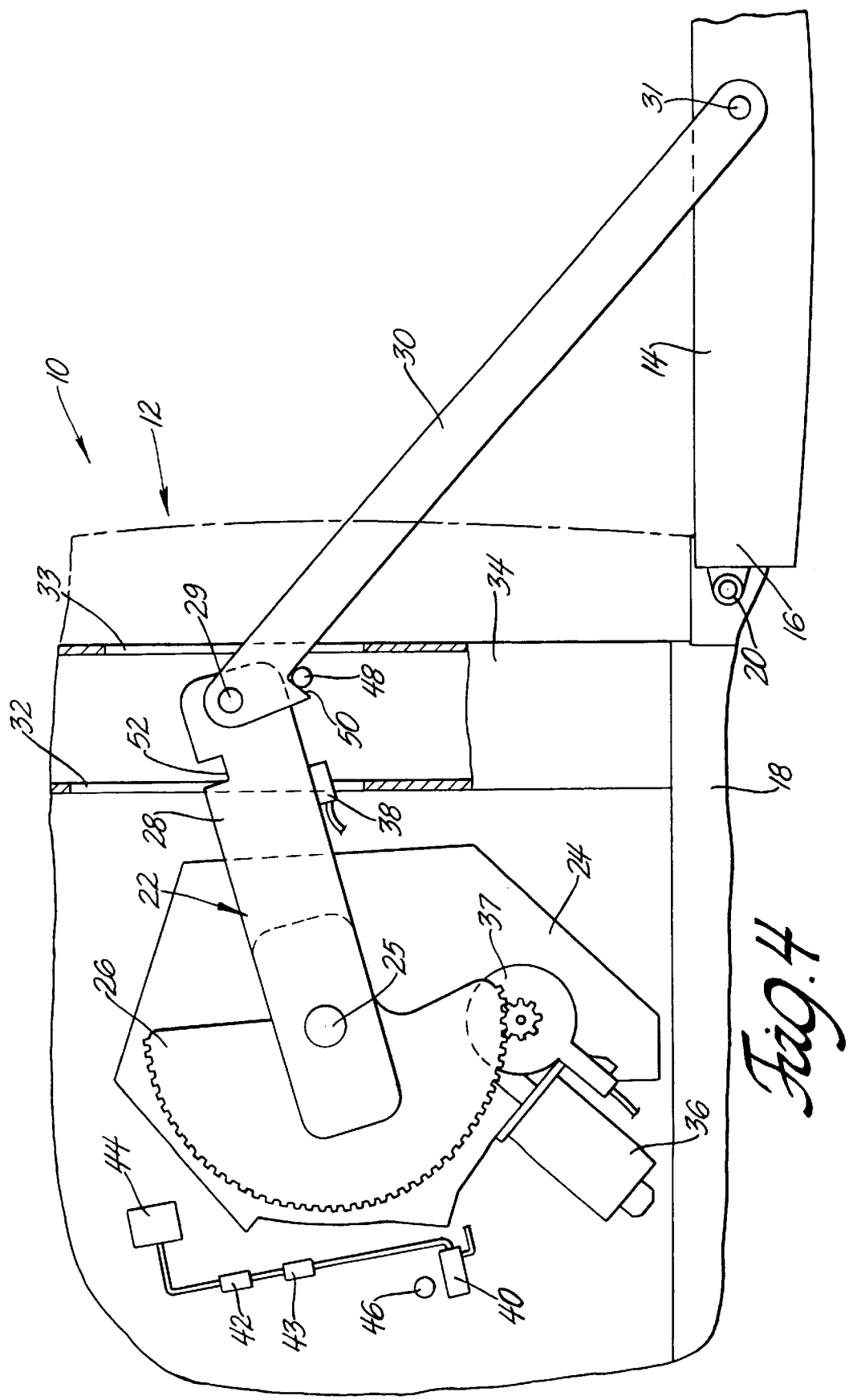
FIG. 4 is a side view of the vehicle and power tailgate of FIG. 1 showing the parts when the tailgate is lowered.

The mechanism for raising and lowering tailgate 14 preferably also includes stops the are attached to vehicle 10 and cooperate with support link 30 to hold tailgate 14 in the raised and lowered positions shown in FIGS. 1 and 3 and FIGS. 2 and 4 respectively. Thus vehicle 10 is equipped with stops 46 and 48 and the support link 30 has a cooperating stop shoulder 50. Stop shoulder 50 engages stop 46 when tailgate 14 is in the raised position shown in FIGS. 1 and 3. At this time, the centerline 27 of support link 30 defined by pivot centers 29 and 31 is over center of the rotor axis 25 by a distance D as best shown in FIG. 3. This over center relationship biases shoulder 50 against the stop 46 responsive to forced pivotal movement of the tailgate toward the lowered position. The sector arm 28 that is pivotally attached to support link 30 is also in an over center relationship at this time. Sector arm 28 has a notch 52 that also engages the stop 46 when in the over center relationship to enhance retention of tailgate 14 in the raised position. Stop shoulder 50 engages stop 48 when tailgate 14 is in the lowered position shown in FIGS. 2 and 4 to prevent tailgate 14 from dropping lower.

Power operated tailgate 14 operates as follows. Assuming tailgate 14 is raised as shown in FIGS. 1 and 3, switch 43 is turned on and then switch 42 is moved to the open or lower position. This energizes motor 36 in the forward direction and rotates sector gear 26 approximately 180° clockwise from the position shown in FIG. 3 to the position shown in FIG. 4 so that tailgate 14 is lowered. When tailgate 14 reaches the lowered or open position, arm 28 engages limit switch 38, which deenergizes motor 36 and resets motor 36 for reverse rotation. Shoulder 50 of arm 28 also engages stop 48 to hold tailgate 14 in the open position. When desired, tailgate 14 is then raised by moving switch 40 to the close or raise position. This energizes motor 36 which is set to rotate in the reverse or counterclockwise raising tailgate 14 to the closed upright position and moving link 30 to the over center position shown in dashed line in FIG. 3 where arm 28 engages limit switch 40 to deenergize motor 36 and shoulder 50 engages stop 46. Tailgate 14 is now locked securely in the raised or closed position without any need for latches or clasps.

Moreover, due to the over center relationship of support link 30, tailgate 30 cannot be lowered manually. Hence, tailgate 30 is also locked in the raised or closed position shown in FIGS. 1 and 3 without any need for a lock or lock mechanism on tailgate 14.

Obviously, many modifications and variations of the present invention in light of the above teachings may be made. It is, therefore, to be understood that, within the scope of the appended claims, the invention may be practiced otherwise than as specifically described.

What is claimed is:

1. A vehicle having a power operated tailgate comprising:
   the tailgate having a bottom end that is hinged to the vehicle so that the tailgate pivots about a hinge axis between a raised position and a lowered position,
   a rotor mounted on the vehicle for rotation about a rotor axis between a first position and a second position,
   a link having one end pivotally attached to the rotor and another end pivotally attached to the tailgate at a location spaced from the hinge axis so that the tailgate is in the raised position when the rotor is in the first position and in the lowered position when the rotor is in the second position, and
   a motor for rotating the rotor between the first position and the second position.

2. The vehicle having the power operated tailgate as defined in claim 1 wherein the rotor includes a sector gear and a sector arm that rotates in unison with the sector gear and wherein the one end of the link is pivotally attached to the sector arm.

3. A vehicle having a power operated tailgate comprising:
   the tailgate having a bottom end that is hinged to the vehicle so that the tail gate pivots about a hinge axis between a raised position and a lowered position,
   a rotor mounted on the vehicle for rotation about a rotor axis between a first position and a second position,
   a link having one end pivotally attached to the rotor and another end pivotally attached to the tailgate at a location spaced from the hinge axis so that the tailgate is in the raised position when the rotor is in the first position and in the lowered position when the rotor is in the second position,
   a motor for rotating the rotor between the first position and the second position, and
   the vehicle having a stop and the link having a shoulder that engages the stop when the tailgate is in the raised position.

4. The vehicle having the power operated tailgate as defined in claim 3 wherein the link has an centerline that is over center of the rotor axis when the tailgate is in the raised position so that the shoulder is biased against the stop responsive to forced pivotal movement of the tailgate toward the lowered position.

5. The vehicle having the power operated tailgate as defined in claim 3 wherein the vehicle has a second stop that is engaged by the link when the tailgate is in the lowered position.

6. The vehicle having the power operated tailgate as defined in claim 4 wherein the vehicle has a second stop that is engaged by the link when the tailgate is in the lowered position.

7. A vehicle having a power operated tailgate comprising:
   the tailgate having a bottom end that is pivotally attached to the vehicle by a hinge so that the tailgate pivots about a hinge axis between a raised position and a lowered position,
   a rotor including a sector gear that is mounted on the vehicle for rotation about a rotor axis between a first position and a second position,
   a sector arm that is attached to the sector gear for rotation in unison with the sector gear,
   a support link that is pivotally attached to the sector arm at one location and pivotally attached to the tailgate at another location that is spaced from the one location and the hinge axis so that the tailgate is raised and lowered as the sector gear rotates back and forth between the first position and the second position and
   a reversible motor that is drivingly connected to the sector gear for rotating the sector gear between the first position and the second position.

8. The vehicle having the power operated tailgate as defined in claim 7 wherein the rotor axis is substantially parallel to the hinge axis.

9. A vehicle having a power operated tailgate comprising:
   the tailgate having a bottom end that is pivotally attached to the vehicle by a hinge so that the tailgate pivots about a hinge axis between a raised position and a lowered position,
   a rotor including a sector gear that is mounted on the vehicle for rotation about a rotor axis between a first position and a second position, the rotor axis being substantially parallel to the hinge axis.
   a sector arm that is attached to the sector gear for rotation in unison with the sector gear,
   a support link that is pivotally attached to the sector arm at one location and pivotally attached to the tailgate at another location that is spaced from the one location and the hinge axis so that the tailgate is raised and lowered as the sector gear rotates back and forth between the first position and the second position,
   a reversible motor that is drivingly connected to the sector gear for rotating the sector gear between the first position and the second position,
   the vehicle having a stop and the support link having a shoulder that engages the stop when the tailgate is in the raised position, and
   the support link having a centerline that is over center of the rotor axis when the tailgate is in the raised position so that shoulder is biased against the stop responsive to forced pivotal movement of the tailgate toward the lowered position.

10. The vehicle having the power operated tailgate as defined in claim 9 wherein the sector arm has a notch that engages the stop when the tailgate is in the raised position and the vehicle has a second stop that is engaged by the shoulder of the support link when the tailgate is in the lowered position.

11. A vehicle having a tailgate comprising:
- the tailgate having a bottom end that is pivotally attached to the vehicle by a hinge so that the tailgate pivots about a hinge axis between a raised position and a lowered position,
- a rotor arm that is mounted on the vehicle for rotation about a rotor axis between a first position and a second position, the rotor axis being substantially parallel to the hinge axis,
- a support link that is pivotally attached to the rotor arm at one location and pivotally attached to the tailgate at another location that is spaced from the one location and the hinge axis so that the rotor rotates back and forth between the first position and the second position as the tailgate is raised and lowered,
- the vehicle having a stop and the support link having a shoulder that engages the stop when the tailgate is in the raised position, and
- the support link having a centerline that is over center of the rotor axis when the tailgate is in the raised position so that shoulder is biased against the stop responsive to forced pivotal movement of the tailgate toward the lowered position.

12. The vehicle having the tailgate as defined in claim 11 wherein the rotor arm has a notch that engages the stop when the tailgate is in the raised position and the vehicle has a second stop that is engaged by the shoulder of the support link when the tailgate is in the lowered position.

* * * * *